(12) United States Patent
Alspaugh et al.

(10) Patent No.: US 11,534,924 B1
(45) Date of Patent: Dec. 27, 2022

(54) SYSTEMS AND METHODS FOR GENERATING MODELS FOR AUTOMATED HANDLING OF VEHICLES

(71) Applicant: Amazon Technologies, Inc., Seattle, WA (US)

(72) Inventors: David L. Alspaugh, Seattle, WA (US); Dipan M. Shah, Kenmore, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 16/935,031

(22) Filed: Jul. 21, 2020

(51) Int. Cl.
*B25J 13/08* (2006.01)
*B64C 39/02* (2006.01)

(52) U.S. Cl.
CPC ........... *B25J 13/085* (2013.01); *B25J 13/089* (2013.01); *B64C 39/024* (2013.01); *B64C 2201/12* (2013.01)

(58) Field of Classification Search
CPC ..... B25J 13/085; B25J 13/089; B64C 39/034; B64C 2201/12
See application file for complete search history.

(56) References Cited

U.S. PATENT DOCUMENTS

| | | | |
|---|---|---|---|
| 5,454,533 A | 10/1995 | Grant et al. | |
| 6,374,982 B1 | 4/2002 | Cohen et al. | |
| 7,373,844 B1 | 5/2008 | Chen et al. | |
| 9,108,805 B2 | 8/2015 | Thomas | |
| 9,452,528 B1 | 9/2016 | Checka et al. | |
| 9,687,982 B1 | 6/2017 | Jules et al. | |
| 9,718,195 B1 | 8/2017 | Youmans | |
| 10,166,676 B1 | 1/2019 | Hudson et al. | |
| 10,279,480 B1 | 5/2019 | Holson et al. | |
| 10,406,685 B1 | 9/2019 | Wilson | |
| 11,014,234 B2 | 5/2021 | Toshimitsu | |
| 11,091,256 B2 | 8/2021 | Cappelleri et al. | |
| 11,154,985 B1 | 10/2021 | Strauss | |

(Continued)

FOREIGN PATENT DOCUMENTS

| | | |
|---|---|---|
| DE | 102020125583 A1 | 3/2022 |
| WO | 2020041819 A1 | 3/2020 |
| WO | WO-2021231663 A2 * | 11/2021 |

OTHER PUBLICATIONS

M. Gualtieri, A. t. Pas and R. Platt, "Pick and Place Without Geometric Object Models," 2018 IEEE International Conference on Robotics and Automation (ICRA), 2018, pp. 7433-7440, doi: 10.1109/ICRA.2018.8460553.*

(Continued)

*Primary Examiner* — Jeff A Burke
*Assistant Examiner* — Blake A Wood
(74) *Attorney, Agent, or Firm* — Athorus, PLLC

(57) ABSTRACT

Systems and methods relating to generations of models to facilitate safe, automated handling and maneuvering of vehicles, such as unmanned aerial vehicles (UAV), by robotic systems, such as a robotic arm. The described systems and methods can include a robotic system, such as a robotic arm, having a load cell to measure certain forces and torques to generate models representing the behavior of vehicles and surfaces on which the vehicles may be placed and/or from which the vehicles may be removed.

20 Claims, 11 Drawing Sheets

(56) References Cited

U.S. PATENT DOCUMENTS

| | | |
|---|---|---|
| 11,235,890 B1 | 2/2022 | Dahlstrom et al. |
| 2006/0249623 A1 | 11/2006 | Steele |
| 2007/0032923 A1 | 2/2007 | Mossman et al. |
| 2009/0108605 A1 | 4/2009 | Becker et al. |
| 2009/0294584 A1 | 12/2009 | Lovell et al. |
| 2010/0280661 A1 | 11/2010 | Abdallah et al. |
| 2013/0082137 A1 | 4/2013 | Gundlach et al. |
| 2016/0144510 A1 | 5/2016 | Gulhar et al. |
| 2017/0057081 A1 | 3/2017 | Krohne et al. |
| 2017/0109465 A1* | 4/2017 | Wang ............... G06F 17/16 |
| 2017/0277167 A1 | 9/2017 | Noda et al. |
| 2018/0071874 A1 | 3/2018 | Bergeron et al. |
| 2018/0217249 A1 | 8/2018 | Salla et al. |
| 2018/0265295 A1 | 9/2018 | Beckman et al. |
| 2018/0265296 A1 | 9/2018 | Beckman et al. |
| 2018/0286119 A1* | 10/2018 | Felip Leon ........ H04N 13/106 |
| 2018/0345487 A1 | 12/2018 | Sandhu et al. |
| 2019/0152055 A1* | 5/2019 | Abe ................ B25J 9/163 |
| 2019/0283251 A1 | 9/2019 | Nakamoto |
| 2019/0321971 A1 | 10/2019 | Bosworth et al. |
| 2019/0322384 A1 | 10/2019 | Bosworth |
| 2020/0016756 A1 | 1/2020 | Rus et al. |
| 2020/0024853 A1 | 1/2020 | Furrer et al. |
| 2020/0027326 A1 | 1/2020 | Ravat |
| 2020/0055195 A1 | 2/2020 | Ignakov |
| 2020/0070354 A1 | 3/2020 | Nakayama et al. |
| 2020/0361634 A1 | 11/2020 | Gil |
| 2021/0023711 A1 | 1/2021 | Lee et al. |
| 2021/0122039 A1 | 4/2021 | Su et al. |
| 2021/0122056 A1 | 4/2021 | Menon et al. |
| 2021/0125052 A1* | 4/2021 | Tremblay ........... G06N 3/084 |
| 2021/0214163 A1* | 7/2021 | Deacon ............ B65G 1/1378 |
| 2021/0269149 A1 | 9/2021 | Culver |
| 2021/0323171 A1 | 10/2021 | Pivac et al. |
| 2021/0362334 A1 | 11/2021 | Yamane |
| 2021/0387336 A1 | 12/2021 | Fukusen |
| 2022/0226995 A1 | 7/2022 | Beck et al. |

OTHER PUBLICATIONS

J. Janse Van Vuuren, L. Tang, I. Al-Bahadly and K. M. Arif, "A 3-Stage Machine Learning-Based Novel Object Grasping Methodology," in IEEE Access, vol. 8, pp. 74216-74236, 2020, doi: 10.1109/ACCESS.2020.2987341.*

M. Vohra, R. Prakash and L. Behera, "Real-time Grasp Pose Estimation for Novel Objects in Densely Cluttered Environment," 2019 28th IEEE International Conference on Robot and Human Interactive Communication (RO-MAN), 2019, pp. 1-6, doi: 10.1109/RO-MAN46459.2019.8956438.*

J. Gonçalves and P. Lima, "Grasp Planning with Incomplete Knowledge About the Object to be Grasped," 2019 IEEE International Conference on Autonomous Robot Systems and Competitions (ICARSC), 2019, pp. 1-6, doi: 10.1109/ICARSC.2019.8733615.*

Paletta, L., Fritz, G., Kintzler, F., Irran, J., and Dorffner, G. (2007). "Perception and Developmental Learning of Affordances in Autonomous Robots," In Annual Conference on Artificial Intelligence (Cambridge: Springer), 235-250. doi: 10.1007/978-3-540-74565-5_19 (Year: 2007).

Viña, F. E., Bekiroglu, Y., Smith, C., Karayiannidis, Y., Kragic, D. (2013). Predicting Slippage and Learning Manipulation Affordances Through Gaussian Process Regression. In 2013 13th IEEE-RAS International Conference on Humanoid Robots (Humanoids) (pp. 462-468). (Year: 2013).

* cited by examiner

SYSTEMS AND METHODS FOR GENERATING MODELS FOR AUTOMATED HANDLING OF VEHICLES

BACKGROUND

Aerial vehicles typically require handling that is meticulous and precise. However, manual handling of aerial vehicles can be difficult, time consuming, and can often lead to damage of the aerial vehicle. For example, various components such as landing gears, pitot tubes, wings, etc. can be easily damaged. Further, calibrated components can also be inadvertently moved or shifted, which can require recalibration, connectors can become dislodged, etc. Further, the aerial vehicles can be unknowingly subjected to forces and torques that may compromise the structural integrity of the aerial vehicle.

DETAILED DESCRIPTION

Figure 1:
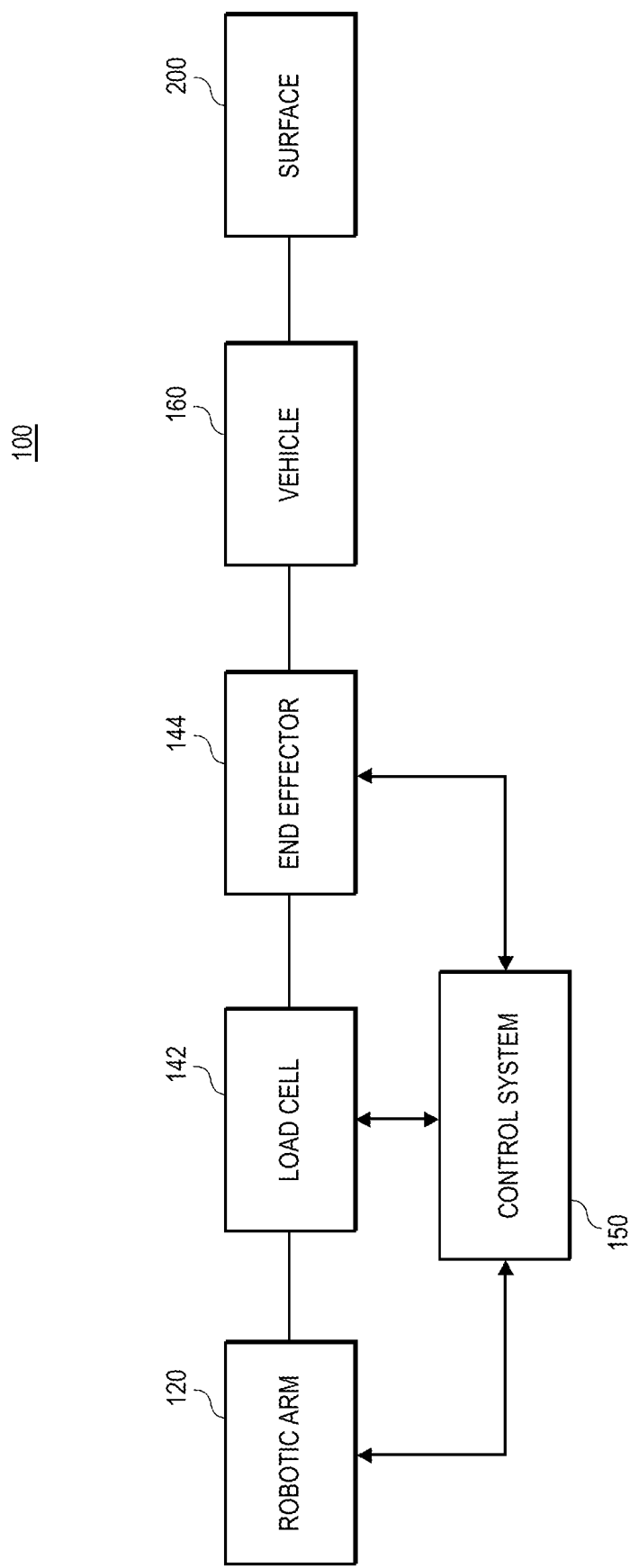
FIG. 1 is a block diagram of an exemplary robotic system, in accordance with embodiments of the present disclosure.

As is set forth in greater detail below, embodiments of the present disclosure are generally directed to systems and methods for facilitating safe, automated handling and maneuvering of vehicles, such as unmanned aerial vehicles (UAV), by robotic systems, such as a robotic arm. The disclosed systems and methods can utilize a robotic system, such as a robotic arm, having a load cell to measure certain forces and/or torques exerted on the vehicle to generate models representing the behavior of vehicles and surfaces on which the vehicles may be placed and/or from which the vehicles may be removed. The behavior of the interaction of the vehicle and the surface can be affected by various characteristics, such as, for example, the shape, texture, angle, deformability, density, elasticity, smoothness, roughness, etc. of both the vehicle and the surface at the points at which they come into contact. Accordingly, the generated models can be utilized to understand the various characteristics that contribute to the behavior of the interaction of a vehicle and surface, and can facilitate safe, automated handling of vehicles in view of the varied characteristics different ground surfaces and ground equipment may present.

In generating the models, embodiments of the present disclosure can provide systems and methods that can measure certain forces and/or torques exerted on vehicles as they are being placed and/or raised from a surface. A robotic system, such as a robotic arm, can raise and/or place vehicles on a surface, and the forces and/or torques exerted on the vehicle can be measured as the vehicle is being raised and/or placed. According to certain aspects of the present disclosure, the force and torque measurements can be performed using a load cell. For example, the robotic arm performing the raising and/or placement of the vehicle can include a load cell disposed along the robotic arm. Preferably, the load cell may be rigidly coupled to an end effector, which can engage the vehicle, at a wrist of the robotic arm, and can measure forces and/or torques exerted on the end effector in at least six degrees of freedom of motion (e.g., translation along the X-axis, Y-axis, and Z-axis and rotation about the X-axis, Y-axis, and Z-axis).

The robotic system can iteratively raise and/or place the vehicle on the surface while the vehicle is oriented in various different poses so as to obtain more diverse measurements of the forces and/or torques exerted on the vehicle. For example, a robotic arm can measure the forces exerted on a vehicle while it is performing a first placement of a vehicle on a surface. After the measurements have been performed, the robotic system can adjust the pose of the vehicle and perform further measurements of the forces and/or torques exerted on the vehicle as the vehicle is again placed on the surface while oriented with the adjusted pose. This process can be repeated while the vehicle is oriented in various different poses to obtain additional measurement data of the forces and/or torques exerted on the vehicle during the placement procedure. The repeated measurement of forces and torques can also be performed for other maneuvers (e.g., raising of the vehicle, etc.) that may be performed as well.

In generating the model of the behavior of the vehicle and the surface, the various forces and/or torques measured while raising and/or placing the vehicle can facilitate determining characteristics associated with the behavior of the interaction of the vehicle with the surface. For example, as a vehicle is being placed on a surface (or raised from the surface), the measured forces and/or torques can be used to determine various characteristics, such as the coefficient of friction at the point(s) of contact, damping forces, elastic forces, etc. In determining these characteristics, the vehicle and the surface can be modeled as mechanical systems (e.g., a second order mechanical system, etc.). Additionally, since different vehicles and different surfaces can present varied inertial forces, damping forces, elastic forces, etc., the generated models can be specific to the vehicle type and the surface type, such that a unique model can be generated for each combination of vehicle type and surface type. Additional models can also be generated in view of other parameters (e.g., temperature, humidity, sunlight, moisture, etc.) that may affect the behavior of the interaction between the vehicle and the surface.

According to certain aspects of the present disclosure, these models can be used to determine safe processes and procedures for raising and/or placing a specific vehicle on a certain surface to facilitate safe handling of the vehicle. For example, the models can be used to determine preferred poses and sequences of movements to facilitate safe handling of the vehicle so that the vehicle may not be placed to stress components of the vehicle (e.g., landing gear, chassis, etc.) in view of reactive forces presented by the surface or be inadvertently displaced (e.g., slide or slip off the surface, rebound or bounce, etc.). Further, additional force and/or torque measurements can be performed during raising and/or placement procedures and provided as feedback so that the model can be updated in view of the additional measurements, as necessary.

Although embodiments of the present disclosure are described primarily with respect to aerial vehicles and ground surfaces and ground support equipment, embodiments of the present disclosure can be applicable to any other types of vehicles and any structures that they may contact. For example, embodiments of the present disclosure can be applicable to unmanned aerial vehicles, ground based vehicles, autonomous ground based vehicles, water based vehicles, unmanned water based vehicles, etc., as well as racks, other supporting structures, storage facilities, etc. Further, although embodiments of the present disclosure are described primarily with respect to a load cell disposed at a wrist of a robotic arm, embodiments of the present disclosure also contemplate employing one or more additional load cells disposed at various positions along the robotic arm, as well as other force and torque sensors/detectors, which can also be employed in place of or in conjunction with the load cells described herein.

FIG. 1 is a block diagram showing an exemplary configuration of robotic system 100 according to embodiments of the present disclosure. As described herein, robotic system 100 can be used to generate models representing the behavior of vehicles interacting with a surface. As shown in FIG. 1, robotic system 100 can include robotic arm 120, load cell 142, end effector 144, and control system 150. In FIG. 1, robotic system 100 is shown engaged to vehicle 160, which may be contacting and interacting with surface 200. Accordingly, robotic system 100 can be used to engage vehicle 160 and perform certain force and/or torque measurements while manipulating and/or handling an engaged vehicle (e.g., as vehicle 160 is contacting and interacting with surface 200). The measurements can then be utilized to generate models representing the behavior of the interaction of vehicle 160 and surface 200. For example, end effector 144 can engage vehicle 160, and, while robotic arm 120 is maneuvering (e.g., raising the vehicle from a surface, placing the vehicle onto a surface, etc.) vehicle 160, load cell 142 can measure certain forces and/or torques exerted on vehicle 160 by the interaction of vehicle 160 with surface 200.

According to embodiments of the present disclosure, surface 200 can include any surface, structure, system, etc. with which vehicle 160 may physically interact and/or contact. For example, surface 200 can include the ground, the floor of a hangar or other facility, a ground support equipment, a robot, a harness, a rack, a gantry, a conveyance, another vehicle, etc., or any other type of structure, system, component, or mechanism on which vehicle 160 may be placed or with which vehicle 160 may otherwise interact and/or contact. Additionally, surface 200 may represent a multi-order mechanical system of multiple components and/or systems. For example, surface 200 may include a ground surface. Alternatively, surface 200 may include a ground support equipment resting on a ground surface. According to yet another aspect, surface 200 can include a robot disposed on a ground support equipment, which is resting on a ground surface. Surface 200 can include any combination of structures, systems, and/or components that may interact with and/or contact vehicle 160. Accordingly, embodiments of the present disclosure may be applicable to generating models predicting the behavior of vehicles with a wide range of various surfaces, which may include multiple structures, components and systems interacting with one another.

Additionally, as shown in FIG. 1, control system 150 can communicate with each of robotic arm 120, load cell 142, and end effector 144 to send and receive data and other information, including one or more instructions and/or commands, etc. to facilitate automated operation of robotic system 100. For example, control system 150 can instruct engagement of vehicle 160 via end effector 144, maneuvering of vehicle 160 using robotic arm 120, and measurement of the forces and/or torques exerted on vehicle 160 using load cell 142. As described further herein, the measured forces and/or torques can be used to generate models representing the behavior of the interaction of vehicle 160 with surface 200. Although robotic system 100 is shown as including robotic arm 120, other embodiments can employ other robotic systems (e.g., gantry, etc.) and load cell 142 can include any type of load cell (e.g., electric, hydraulic, pneumatic, strain-gauge, piezoresistive, inductive, etc.), or any other type of force sensor or detector.

Figure 2A:
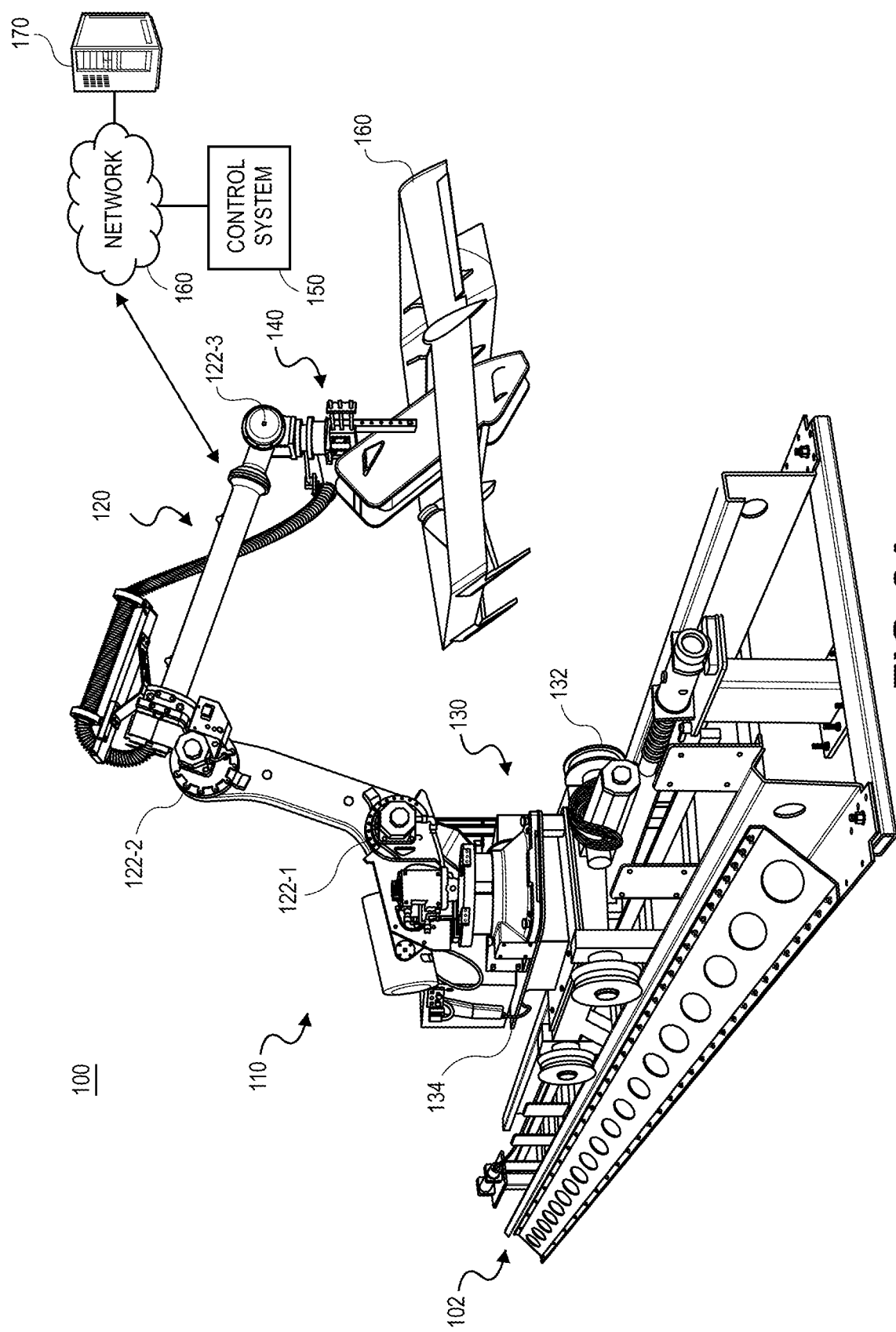
FIGS. 2A and 2B are illustrations of an exemplary robot, in accordance with embodiments of the present disclosure.
Figure 2B:
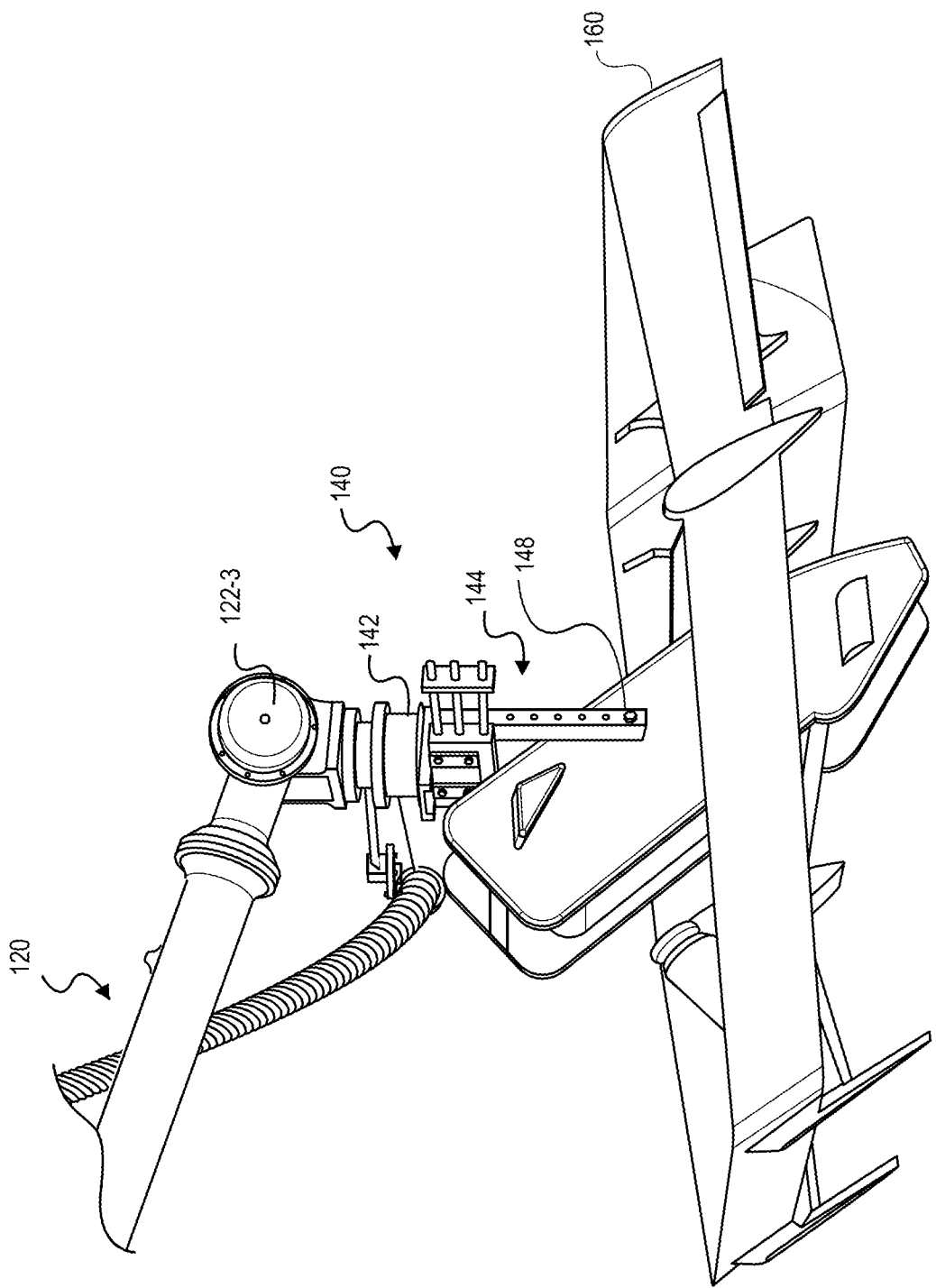

FIGS. 2A and 2B are illustrations of an exemplary robotic system 100 in accordance with embodiments of the present disclosure. As shown in FIG. 2A, robotic system 100 can include robot 110 with robotic arm 120, which can include end-of-arm tool 140.

According to certain embodiments of the present disclosure, robot 110 can be used in the automated handling of a vehicle (e.g., an unmanned aerial vehicle) and can be used to perform certain force and/or torque measurements to generate models describing the behavior of the interaction of a vehicle with a surface. FIGS. 2A and 2B show robot 110 with robotic arm 120 and end-of-arm tool 140 engaged with aerial vehicle 160. As shown in FIG. 2A, robot 110 can include carriage portion 130 and robotic arm 120. Robotic arm 120 can include end-of-arm tool 140 and a plurality of articulating pivots 122. Pivots 122 can provide for multiple degrees of freedom of movement (e.g., six degrees of freedom of movement—translation along the X-axis, Y-axis, and Z-axis and rotation about the X-axis, Y-axis, and Z-axis). Robot 110 can also include carriage portion 130, which can include base 134 and wheels 132. Base 134 can support robotic arm 120, while wheels 132 can engage track 102 on which robot 110 may operate. Accordingly, track 102 can facilitate robot 110 to travel along track 102 and transport aerial vehicle 160 to locations disposed along track 102.

Robot 110 can also employ a multitude of various sensors to facilitate autonomous operation. For example, robot 110 can include proximity sensors, imaging sensors (e.g., cameras), speed sensors, force and torque detectors, laser sensors (e.g., LIDAR), thermal sensors, radar, accelerometers, gyroscopes, radio-frequency identification (RFID) sensors, etc. to facilitate autonomous operation of robot 110. For example, aerial vehicles may land, or be oriented in various different poses, and the multitude of sensors can facilitate detection of the pose of the aerial vehicle and the location of the contact point(s) on the aerial vehicle to allow robotic arm 120 to safely and securely engage the aerial vehicle without damaging the aerial vehicle.

Further, robot 110 can communicate with control system 150 (or other computer system such as computing system 170) via network 160. For example, network 160 can include any wired or wireless network (e.g., cellular, satellite, Bluetooth, Wi-Fi, etc.) such as a local area network, wide area network, etc. that can facilitate communications between robot 110 and control system 150, as well as other computing systems such as computing system 170. Robot 110 and control system 150 can transmit data and other information, including one or more instructions and/or commands, via network 160. Control system 150 is discussed in further detail below with respect to FIG. 8, which can control the operation, engagement of vehicles, routing, navigation, communication, etc. of robot 110, as well as the measurement of forces and torques by a load cell coupled to robot 110. According to certain aspects of the present disclosure, robot 110 can include a direct link (e.g., via network 160, or other network) to a safety system in the facility in which robot 110 may be operating. For example, if robot 110 were to detect a fault or other condition, it could transmit an alert directly to the safety system of the facility so that any such condition could receive prompt attention.

As shown in FIGS. 2A and 2B, end-of-arm tool 140 can be disposed at one end of robotic arm 120 and can engage (and disengage) a vehicle (e.g., an aerial vehicle, etc.). To grasp and engage a vehicle, end-of-arm tool 140 can include load cell 142 and end effector 144. End effector 144 can be configured to be received by and/or mate with a contact point of the vehicle with which it is engaging. Further, load cell 142 can be coupled to end effector 144, such that forces and torques exerted on end effector 144 (e.g., by an engaged vehicle) can be measured by load cell 142. Load cell 142 can include any load cell (e.g., electric, hydraulic, pneumatic, strain-gauge, piezoresistive, inductive, etc.), or any other type of force sensor or detector. Preferably, load cell 142 is rigidly coupled to end effector 144 at a wrist joint of robotic arm 120 to decrease loss so that load cell 142 can accurately measure the forces and torques exerted on end effector 144. Alternatively, load cell 142 can be positioned at any point along robotic arm 142 (e.g., adjacent to any pivots 122 or any point in between). According to certain aspects of the present disclosure, multiple load cells 142 can be employed and positioned at various positions along robotic arm 120 and end-of-arm tool 140, and the forces and torques measured by the multiple load cells can be aggregated and combined in determining the overall forces and torques exerted on end effector 144. According to embodiments of the present disclosure, load cell 142 can measure the forces and torques exerted on end effector 144 by a vehicle engaged with end effector 144. Preferably, load cell 142 can measure forces and torques exerted on end effector 144 in six degrees of freedom of movement (e.g., translation along the X-axis, Y-axis, and Z-axis and rotation about the X-axis, Y-axis, and Z-axis).

In connection with automated handling of vehicles, difficulties can be encountered as various structures and surfaces that may come into contact with the vehicle may exhibit varied characteristics in interacting with the vehicles. For example, various surfaces, ground support equipment surfaces, vehicle contact points, etc. can present different coefficients of friction, damping, shock, deformation, and/or vibration properties, which can result in varied reactive forces and moments. Further, it may be preferable for vehicles to interact with numerous different surfaces and ground support equipment for various ground handling procedures (e.g., ground support equipment that can facilitate handling and transportation, ground support equipment that can facilitate maintenance or servicing, ground support equipment that can facilitate storage, etc.).

Accordingly, load cell 142 can measure the forces and torques exerted on end effector 144 as end effector 144 is engaged with a vehicle and is placing and/or raising the vehicle onto and/or from a surface, and these measurements can provide information regarding the vehicle, the surface, and/or the interaction between the vehicle and the surface. In implementations where the surface includes more than one interacting surface, structure, component, system, etc., the measurements can account for the interaction between each of the various surfaces, structures, components, systems, etc. These measurements can then be used to generate models representing the behavior of the interaction of the vehicle and the surface at the contact points to facilitate safe handling of the vehicle so that the vehicle may not be placed to stress components of the vehicle (e.g., landing gear, chassis, etc.) in view of reactive forces presented by the surface or be inadvertently displaced (e.g., slide or slip of the surface, rebound or bounce, etc.). For example, the vehicle and the surface can be modeled as mechanical systems and the measured forces and torques can be utilized to determine certain parameters of the vehicle and the surface (e.g., the equivalent mass of the vehicle and the surface, the damping coefficients of the vehicle and the surface, the stiffness coefficient of the vehicle and the surface, the frictional coefficients, etc.).

In addition to measuring forces and/or torques for the generation of models representing the behavior of a vehicle as it interacts with a surface, certain the forces and torques can also be measured while robot 110 is handling, moving, and/or manipulating a vehicle engaged with end effector 144. This can allow, for example, robot 110 to determine whether the engaged vehicle is being handled and/or manipulated such that the forces exerted on the vehicle are less than the force and torque limits that the vehicle should experience while being handled, moved, and/or manipulated. Moreover, robot 110 can also measure forces and torques while performing placement and/or lifting procedures in accordance with generated models, and the additional force and/or torque measurements can be provided as feedback to update the model accordingly, if necessary. Additionally, defined protocols and/or predetermined sequences of movement/manipulation of an engaged vehicle can also be established to obtain specific force and torque measurements associated with the vehicle to determine inertial parameters associated with the aerial vehicle (e.g., mass, weight, center of gravity, moment of inertia, vibration response, etc.) and/or perform diagnostics and/or assessments of the aerial vehicle. An engaged vehicle can also be vibrated such that load cell 142 can also measure a vibration response of the aerial vehicle. Other movements and procedures can also be utilized depending on the type of information that is to be determined.

In addition to generating models representing the behavior of vehicles and surfaces, these forces and torques exerted on end effector 144 and measured by load cell 142 can be used to determine various information regarding the vehicle and the quality of the engagement between end effector 144 and the vehicle. For example, the measurement of the forces and torques exerted on the end effector by the vehicle can facilitate determining inertial properties or parameters associated with the vehicle (e.g., as mass, weight, moment of inertia, center of gravity, etc.). Additionally, these measurements can be used to provide an assessment of the engagement of end effector 144 with the vehicle (e.g., quality of engagement, alignment of the engagement, incorrect or improper engagement, etc.), as well as an assessment of the aerial vehicle itself and/or a payload associated with the aerial vehicle (e.g., whether a payload was delivered, whether a payload shifted during transport, whether the aerial vehicle suffered a collision, whether an inertial property has changed, the vibration response of the aerial vehicle, etc.). Since the measurement of these forces and torques exerted on the end effector 144 can be used to determine the engagement of end effector 144 with a vehicle, contact sensors typically are unnecessary. Further, traditional contact sensors can be sensitive to dirt, dust, moisture, temperature, grease, water, vibrations in the object to be engaged, etc. Additionally, traditional contact sensors typically require visual and/or audio feedback to register the instant of contact and also introduce design constraints on the shape of the tool that is engaging the object, as well as the contact point of the object with which it is engaging. Utilizing a load cell that can measure the forces and torques exerted on the end effector can avoid these limitations and shortcomings of traditional contact sensors Accordingly, end effector 144 preferably does not include any contact sensors (e.g., on the "fingers," etc.) that may be used to determine the quality of an engagement of the vehicle.

FIG. 2B shows a closeup view of end-of-arm tool 140, which can include load cell 142 and end effector 144. FIG. 2B shows end-of-arm tool 140 engaged with aerial vehicle 160. As shown in FIG. 2B, load cell 142 is rigidly coupled to end effector 144 at the wrist joint of robot arm 120, and end effector 144 can include arms 146, which can include engagement members 148 coupled thereto. To engage a vehicle, engagement members 148 can be received by and mate with a contact point on the aerial vehicle, and arms 146 can articulate between open and closed positions to securely engage the vehicle.

As arms 146 are articulated from an open position to a closed position to engage vehicle 160, engagement members 148 can engage a contact point of vehicle 160. According to certain aspects, the contact point on the aerial vehicle can include an opening, cavity, or recess, and engagement members 148 can include protrusions or bars that are received in the opening, recess, or cavity. According to certain aspects, engagement members 148 can include keyed protrusions and the contact point on the vehicle can include an opening or cavity with a shape that is complementary to engagement members 148, so as to facilitate secure engagement of engagement members 148 with the contact point of aerial vehicle 160.

Figure 3:
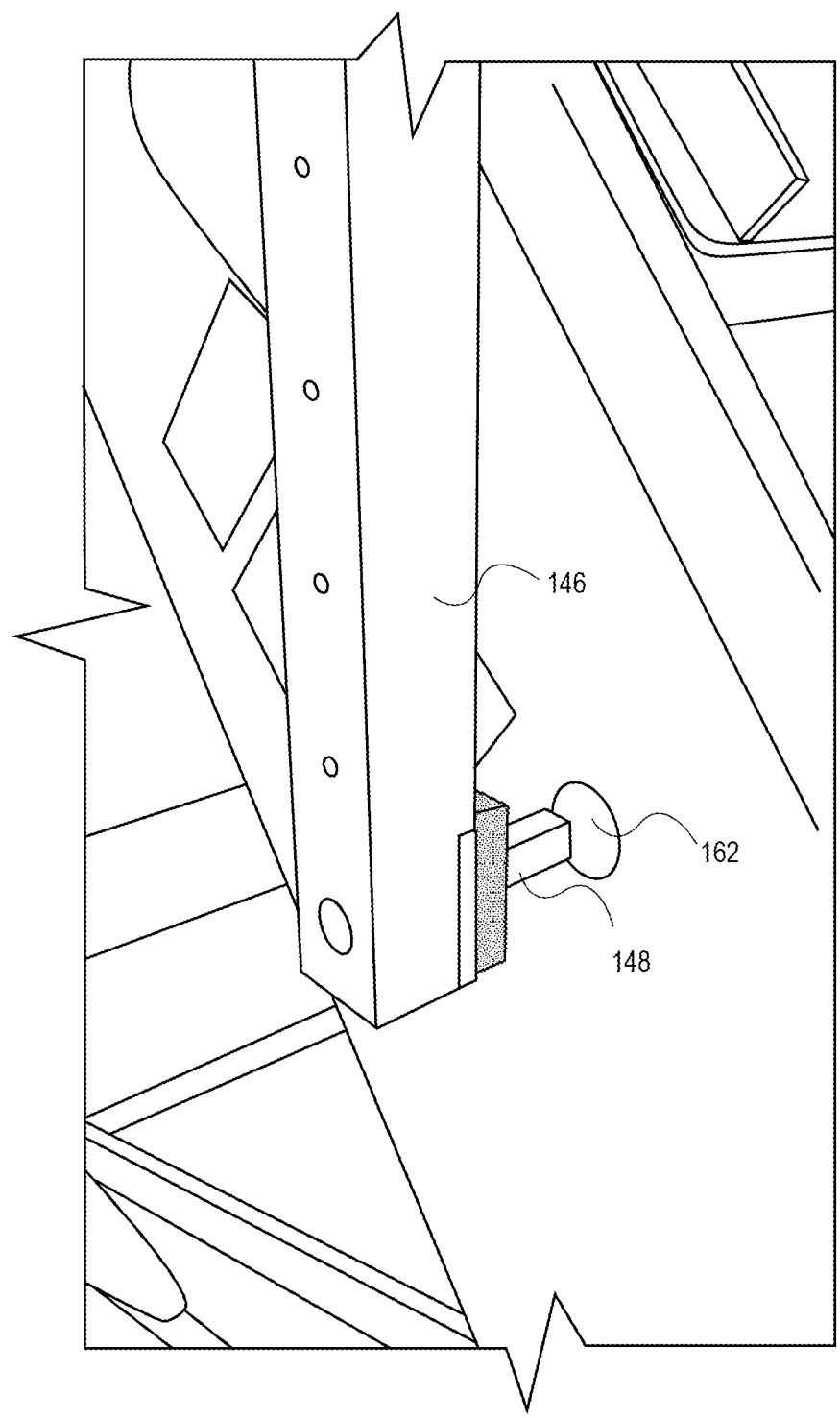
FIG. 3 is an illustration of an exemplary engagement apparatus, in accordance with embodiments of the present disclosure

FIG. 3 shows a closeup view of end effector 144 where arms 146 are in an open position and engagement member 148 is not engaged with contact point 162 of a vehicle. As shown in FIG. 3, contact point 162 includes an opening, cavity, or recess, with which engagement member 148 can engage. According to certain embodiments, robot 110 can include proximity sensors and/or laser ranging sensors to determine the position and pose of the aerial vehicle relative to end effector 144. Based on the determination of the position and pose of the aerial vehicle, end effector 144 can be oriented such that engagement member 148 is aligned with contact point 162 in preparation for engagement with contact point 162. According to certain embodiments, the proximity sensors and/or ranging sensors can be disposed on end effector 144. Once the initial alignment is determined, arms 146 can be articulated from the open position to the closed to position such that engagement member 148 engages contact point 162.

Although end effector 144 is shown with arms 146 and engagement members 148 that engage a hard-point on a fuselage of vehicle 160, end effector 144 can include any component, mechanism, and/or structure that can facilitate engagement with any portion of a target object. For example, end effector 144 can include a suction mechanism, a hook mechanism, a gantry mechanism, a harness, etc., or any other type of mechanism that can facilitate engagement with a target object, such as an aerial vehicle. Different end effectors may be selected based on the position and location of the engagement point on the vehicle by the end effector, as well as the surface on which the vehicle may be placed. For example, in implementations where the vehicle is placed on a rack that engages with a hard point on the fuselage of the vehicle, an end effector having a different configuration and design as end effector 144 shown in FIG. 3 would preferably be employed, such as a suction mechanism, a harness mechanism, etc.

Additionally, other manipulations and handling of the aerial vehicle (e.g., where robot 110 is maintaining the aerial vehicle in a fixed position, where robot 110 is manipulating the aerial vehicle through an established protocol of sequenced movements, etc.) may have predetermined expected force and torque values. Forces and torques measured by load cell 142 that deviate from the respective expected values by more than an acceptable tolerance range may indicate a fault condition with the aerial vehicle and/or the engagement of end effector 144 with the aerial vehicle. Additionally, certain protocols of sequenced movements can be established to specifically determine certain inertial properties or parameters associated with the aerial vehicle (e.g., weight, mass, moment of inertia, center of gravity, etc.) and/or diagnose or troubleshoot potential fault conditions associated with the aerial vehicle.

Figure 4A:
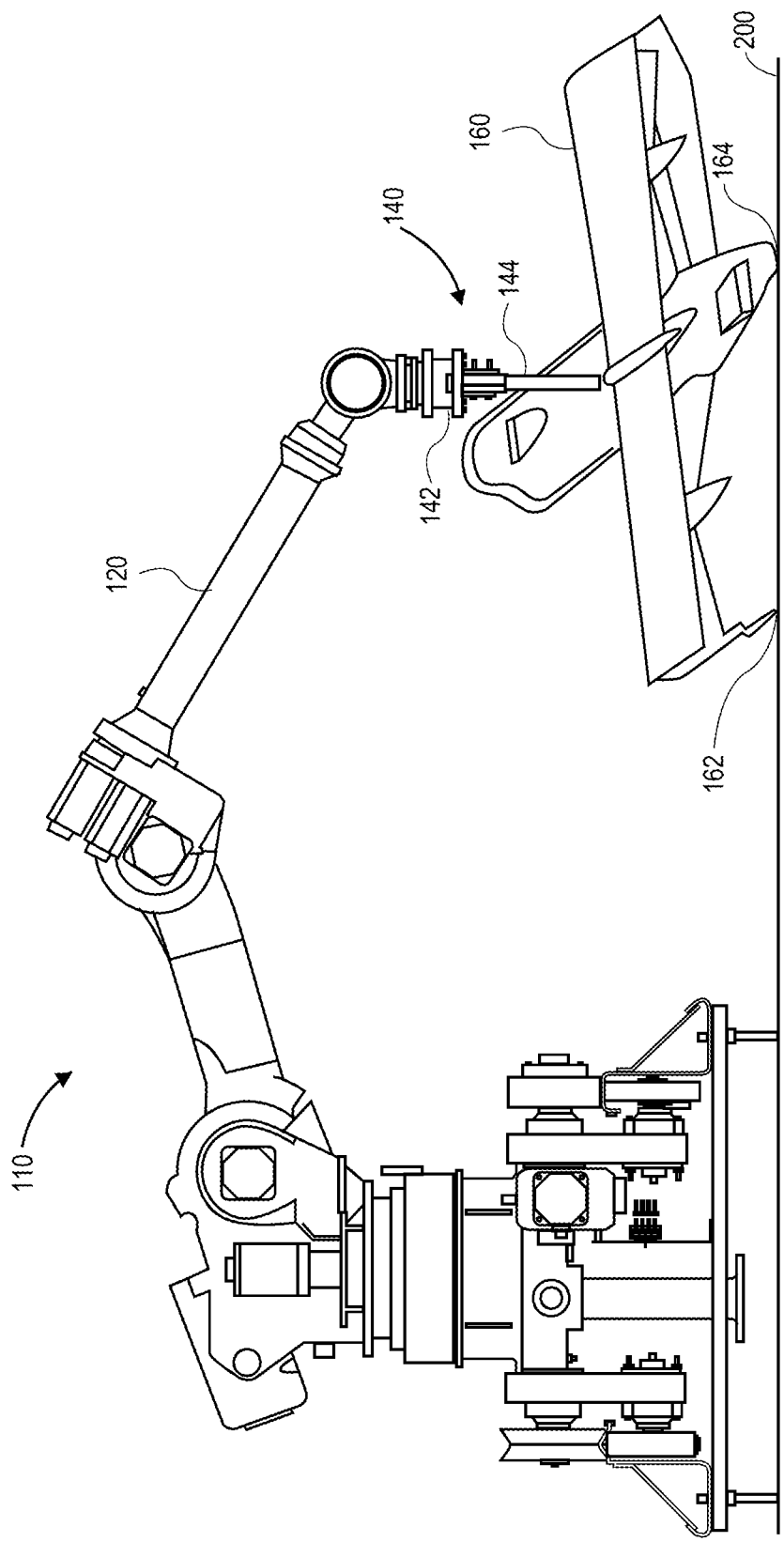
FIG. 4A is an illustration of an exemplary system performing force and/or torque measurements of a vehicle, in accordance with embodiments of the present disclosure

FIG. 4A is an illustration of an exemplary system performing force and/or torque measurements of a vehicle according to embodiments of the present disclosure. As shown in FIG. 4A, vehicle 160 may be engaged by end-of-arm tool 140 (e.g., via end effector 144) and load cell 142 may measure forces and/or torques exerted on vehicle 160 as vehicle 160 is placed on surface 200. Accordingly, FIG. 4A may be an illustration of robotic arm 120 placing vehicle 160 on surface 200 to measure the forces and/or torques (e.g., using load cell 142) exerted on vehicle 160 as vehicle 160 is placed on surface 200. The force and/or torque measurements can then be used to generate a model representing the behavior of vehicle 160 with surface 200. Although surface 200 is shown as a flat smooth surface, surface 200 may be any surface on which vehicle 160 may be placed. For example, surface 200 may be textured, angled, concave, convex, etc. or have any other shape or surface characteristic, or include any other structure, components, system, etc. on which vehicle 160 may be placed.

Alternatively and/or in addition, FIG. 4A may also depict robotic arm 120 raising vehicle 160 from surface 200 to measure the forces and/or torques (e.g., using load cell 142) exerted on vehicle 160 as vehicle 160 is raised from surface 200. These measurements may supplement and/or be used in place of the measurements made while placing vehicle 160 on surface 200.

Further, although the embodiment shown in FIG. 4A illustrates surface 200 as a ground surface, according to other aspects of the present disclosure, surface 200 can include any surface or structure that vehicle 160 may be placed on (or raised from) or may otherwise come into contact, rest, be supported by, or otherwise interact. For example, robotic arm 120 may place vehicle 160 on a ground support equipment. Alternatively, robotic arm 120 may engage a first hard point disposed on vehicle 160 and may place vehicle 160 on a rack or other structure that may otherwise engage another hardpoint of vehicle 160.

As shown in FIG. 4A, as vehicle 160 is placed on surface 200, contact points 162 and 164 of vehicle 160 may contact and interact with surface 200. Contact points 162 and 164 may include any component and/or portion of vehicle 160 that may contact another surface or structure, such as a landing gear, a hard point of the vehicle, etc. The interaction of vehicle 160 and surface 200 at contact points 162 and 164 may present forces and/or torques on vehicle 160 as surface 200 acts on vehicle 160 through the placement process. These forces and/or torques can be measured by robotic arm 120 (e.g., via load cell 142) to generate a model representing the behavior of the interaction of vehicle 160 and surface 200. For example, the forces can include the forces presented by the weight/mass of vehicle 160, the forces introduced by robotic arm 120, frictional forces present at contact points 162 and 164, elastic forces presented at contact points 162 and 164, damping forces presented at contact points 162 and 164, etc. The various forces and generation of the model representing the characteristics of the interaction between vehicle 160 and surface 200 is described in further detail herein with respect to FIGS. 4B, 5B, and 6.

According to certain exemplary embodiments of the present disclosure, vehicle 160 and surface 200 can be modeled as mechanical systems (e.g., second order mechanical systems), and the various forces and/or torques measured by load cell 142 while placing and/or raising vehicle 160 onto and/or from surface 200 presented by the interaction of vehicle 160 and surface 200 at contact points 162 and 164 can be used to determine various variables to generate the model. For example, the various forces and torques may include frictional forces between vehicle 160 and surface 200, an inertial force of the vehicle (e.g., resulting from a mass and the moment of vehicle 160 at contact points 162 and 164), a damping force, an elastic restoring force, etc. The measured forces can then be utilized to determine certain terms in generation of the model.

As shown in FIG. 4A, the forces and/or torques exerted on vehicle 160 can be measured as vehicle is placed onto and/or raised from surface 200. After the measurements have been performed, a pose of vehicle 160 can be adjusted (e.g., by robotic arm 120), and measurements can again be taken as vehicle 160 is placed onto and/or raised from surface 200 while oriented with the adjusted pose. The adjustment of the pose of vehicle 160 and measuring of forces and/or torques exerted on vehicle 160 while vehicle 160 is placed onto and/or raised from surface 200 can be repeated to obtain a diverse set of measurements that can be used to generate the models.

Figure 4B:
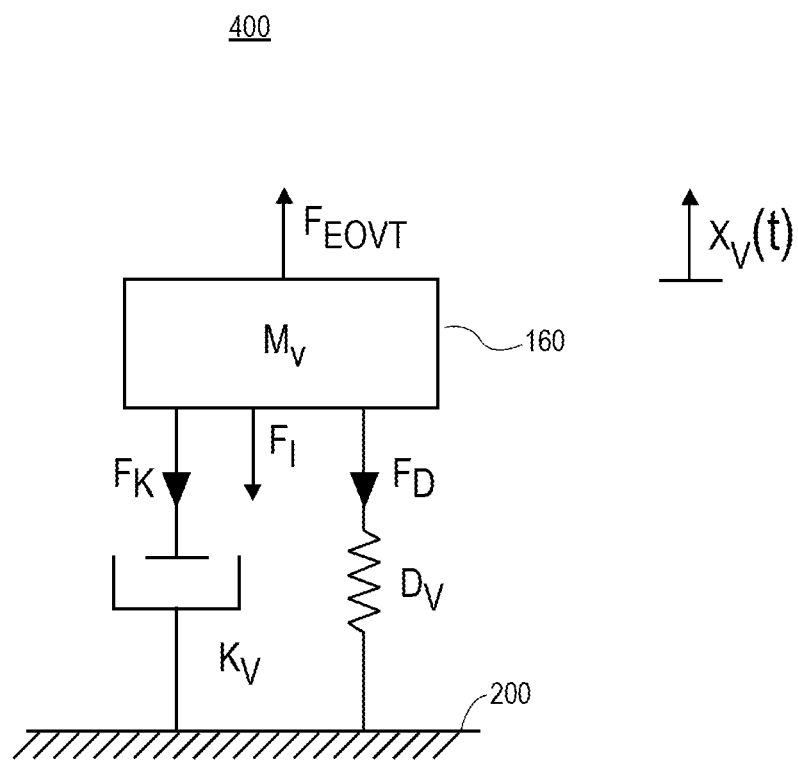
FIG. 4B is a block diagram of an exemplary force diagram, in accordance with embodiments of the present disclosure

FIG. 4B shows a simplified block force diagram 400 representing the behavior of the interaction of vehicle 160 and surface 200 at contact points 162 and 164. As shown in FIG. 4B, the total force exerted on vehicle 160 ($F_{EOVT}$) may be opposed by an inertial force of vehicle 160 ($F_I$), an elastic restoring force ($F_K$), and a viscous damping force ($F_D$). Additionally, $X_V(t)$ can represent a displacement of vehicle 160, $M_v$ can represent the mass of vehicle 160, $K_V$ can represent an elastic restoring coefficient, and $D_V$ can represent a viscous damping coefficient. For clarity, certain other forces (e.g., lateral frictional forces, etc.) have been omitted from FIG. 4B. The force diagram shown in FIG. 4B can be represented as:

$$F_{EOVT}(t) - F_D - F_K = 0$$

The viscous damping force $F_D$ can be the product of the viscous damping coefficient $D_V$ and the derivative of the displacement of vehicle 160, which can be represented as:

$$F_D = D_V \frac{dX_V(t)}{dt}$$

The elastic restoring force $F_K$ can be the product of the elastic restoring coefficient $K_V$ and the displacement of vehicle 160, which can be represented as:

$$F_K = K_V X_V(t)$$

The inertial force can be the product of the mass of vehicle 160 and the second order derivative of the displacement of vehicle 160, which can be represented as:

$$F_I = M_V \frac{d^2 X_V(t)}{dt^2}$$

According to certain aspects of the present disclosure, both dynamic and frictional forces between contact points 162 and 164 of vehicle 160 and surface 200 can also be introduced as additional terms to the equations above. As described herein, the forces measured by load cell 142 as vehicle 160 is placed onto and/or raised from surface 200 can then be utilized in the above equations to determine, for example, the mass $M_V$ of vehicle 160, the viscous damping coefficient $D_V$ associated with vehicle 160, and the elastic restoring coefficient $K_V$ associated with vehicle 160. According to certain aspects of the present disclosure, the measurements can be made during an iterative process where vehicle 160 is repeatedly placed onto and/or raised from surface 200 while oriented in different poses to obtain an overdetermined set of equations from which the mass $M_V$ of vehicle 160, the viscous damping coefficient $D_V$ associated with vehicle 160, and the elastic restoring coefficient $K_V$ associated with vehicle 160 can be determined.

Figure 5A:
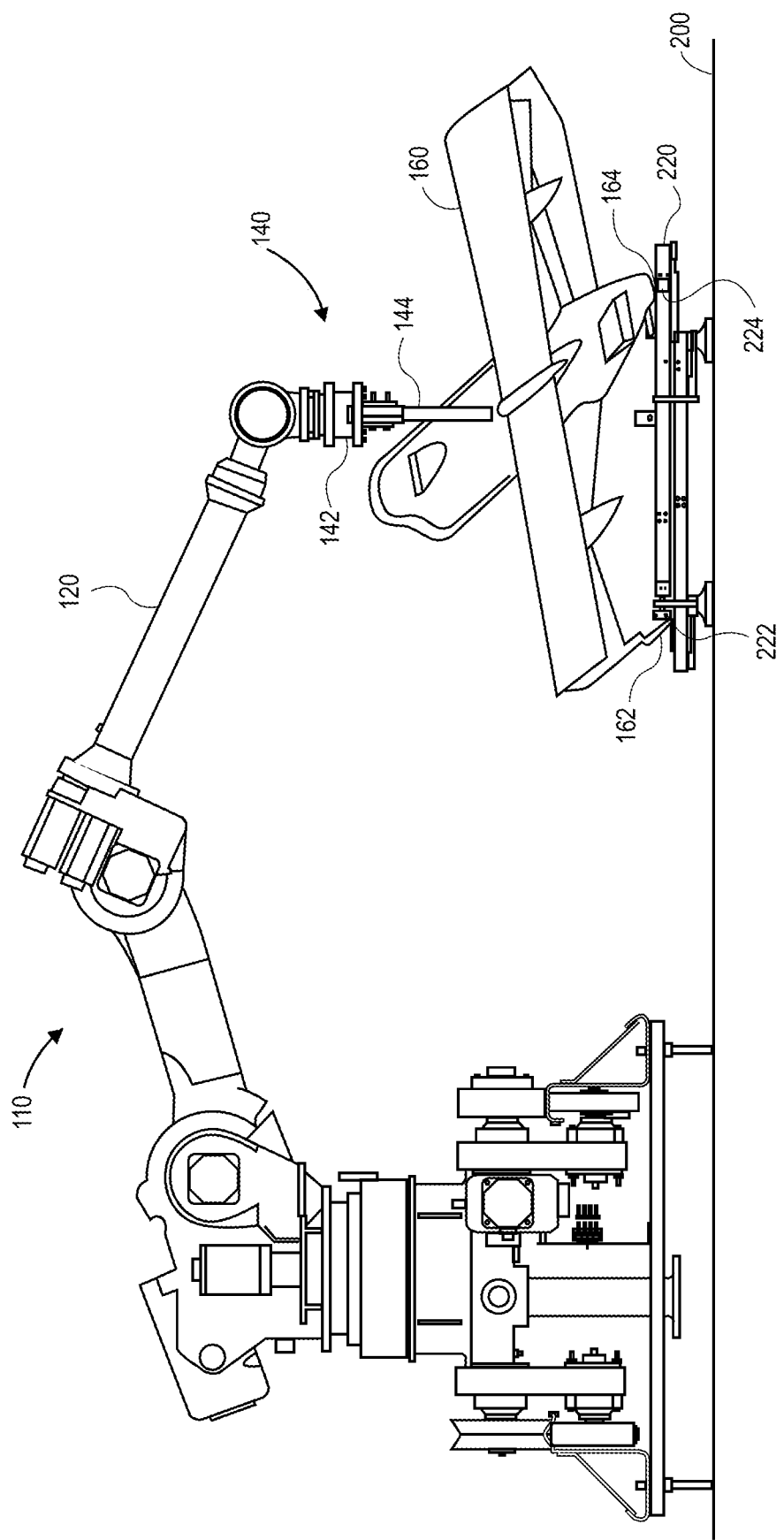
FIG. 5A is an illustration of an exemplary system performing force and/or torque measurements of a vehicle, in accordance with embodiments of the present disclosure

FIG. 5A is an illustration of an exemplary system performing force and/or torque measurements of a vehicle according to embodiments of the present disclosure. The illustration shown in FIG. 5A is substantially similar to the illustration shown in FIG. 4A, however, as shown in FIG. 5A, vehicle 160 is being placed onto and/or being removed from ground support equipment 220. As shown in FIG. 5A, vehicle 160 may be engaged by end-of-arm tool 140 (e.g., via end effector 144) and load cell 142 may measure forces and/or torques exerted on vehicle 160 as vehicle 160 is placed on ground support equipment 220, which is resting on ground surface 200. Accordingly, FIG. 5A may be an illustration of robotic arm 120 placing vehicle 160 on ground support equipment 220 to measure the forces and/or torques (e.g., using load cell 142) exerted on vehicle 160 as vehicle 160 is placed on ground support equipment 220. The force and/or torque measurements can then be used to generate a model representing the behavior of vehicle 160 with ground support equipment 220, and also takes into account the interaction between ground support equipment 220 and ground surface 200.

Although FIG. 5A shows the interaction of vehicle 160 as it interacts with ground support equipment 220, which is resting on ground surface 200, aspects of the present disclosure also contemplate implementations where the surface onto which vehicle 160 may be placed include more components and/or systems (e.g., three, four, five, six, or more) interacting with one another. For example, vehicle 160 may be placed on a robot, which is disposed on a ground support equipment, which is resting on the ground surface, etc. Other scenarios and configurations are also contemplated, and embodiments of the present disclosure can account for all the various interactions between the structures onto which vehicle 160 may be placed in performing the force and/or torque measurements to generate the models.

Alternatively and/or in addition, FIG. 5A may also depict robotic arm 120 raising vehicle 160 from ground support equipment 220 to measure the forces and/or torques (e.g., using load cell 142) exerted on vehicle 160 as vehicle 160 is raised from ground support equipment 220. These measurements may supplement and/or be used in place of the measurements made while placing vehicle 160 on ground support equipment 220.

Ground support equipment 220 shown in FIG. 5A can include any structure or surface that vehicle 160 may be placed on (or raised from) or may otherwise come into contact, rest, be supported by, or otherwise interact. For example, robotic arm 120 may engage a first hard point disposed on vehicle 160 and may place vehicle 160 on a rack or other structure that may otherwise engage another hardpoint of vehicle 160.

As shown in FIG. 5A, as vehicle 160 is placed on ground support equipment 220, contact points 162 and 164 of vehicle 160 may contact and interact with contact surfaces 222 and 224 of ground support equipment 220. Contact points 162 and 164 may include any component and/or portion of vehicle 160 that may contact another surface or structure, such as a landing gear, a hard point of the vehicle, etc. Additionally, contact surfaces 222 and 224 of ground support equipment 220 can be positioned and designed to receive contact points 162 and 164. The interaction of vehicle 160 and ground support equipment 220 (e.g., at contact points 162 and 164 and contact surfaces 222 and 224) may present forces and/or torques on vehicle 160 as ground support equipment 220 acts on vehicle 160 through the placement process. These forces and/or torques can be measured by robotic arm 120 (e.g., via load cell 142) to generate a model representing the behavior of the interaction of vehicle 160 and ground support equipment 220.

For example, the forces can include the forces presented by the weight/mass of vehicle 160 and ground support equipment 220, the forces introduced by robotic arm 120, frictional forces present at contact points 162 and 164 and contact surfaces 222 and 224, elastic forces presented at contact points 162 and 164 and contact surfaces 222 and 224 (e.g., with contributions from both vehicle 160 and ground support equipment 220), damping forces presented at contact points 162 and 164 and contact surfaces 222 and 224 (e.g., with contributions from both vehicle 160 and ground support equipment 220), etc. The various forces and generation of the model representing the characteristics of the interaction between vehicle 160 and ground support equipment 220 is described in further detail herein with respect to FIGS. 5B and 6.

According to certain exemplary embodiments of the present disclosure, vehicle 160 and ground support equipment 220 can be modeled as mechanical systems, and the various forces and/or torques measured by load cell 142 while placing and/or raising vehicle 160 onto and/or from ground support equipment 220 presented by the interaction of vehicle 160 and ground support equipment 220 at contact points 162 and 164 and contact surfaces 222 and 224 can be used to determine various variables to generate the model. For example, the various forces and torques may include frictional forces between vehicle 160 and ground support equipment 220, an inertial force of the vehicle (e.g., resulting from a mass and the moment of vehicle 160 at contact points 162 and 164), a damping force, an elastic restoring force, etc. The measured forces can then be utilized to determine certain terms in generation of the model.

As shown in FIG. 5A, the forces and/or torques exerted on vehicle 160 can be measured as vehicle 160 is placed onto and/or raised from ground support equipment 220. After the measurements have been performed, a pose of vehicle 160 can be adjusted (e.g., by robotic arm 120), and measurements can again be taken as vehicle 160 is placed onto and/or raised from ground support equipment 220 while oriented with the adjusted pose. The adjustment of the pose of vehicle 160 and measuring of forces and/or torques exerted on vehicle 160 while vehicle 160 is placed onto and/or raised from ground support equipment 220 can be repeated to obtain a diverse set of measurements that can be used to generate the models.

Figure 5B:
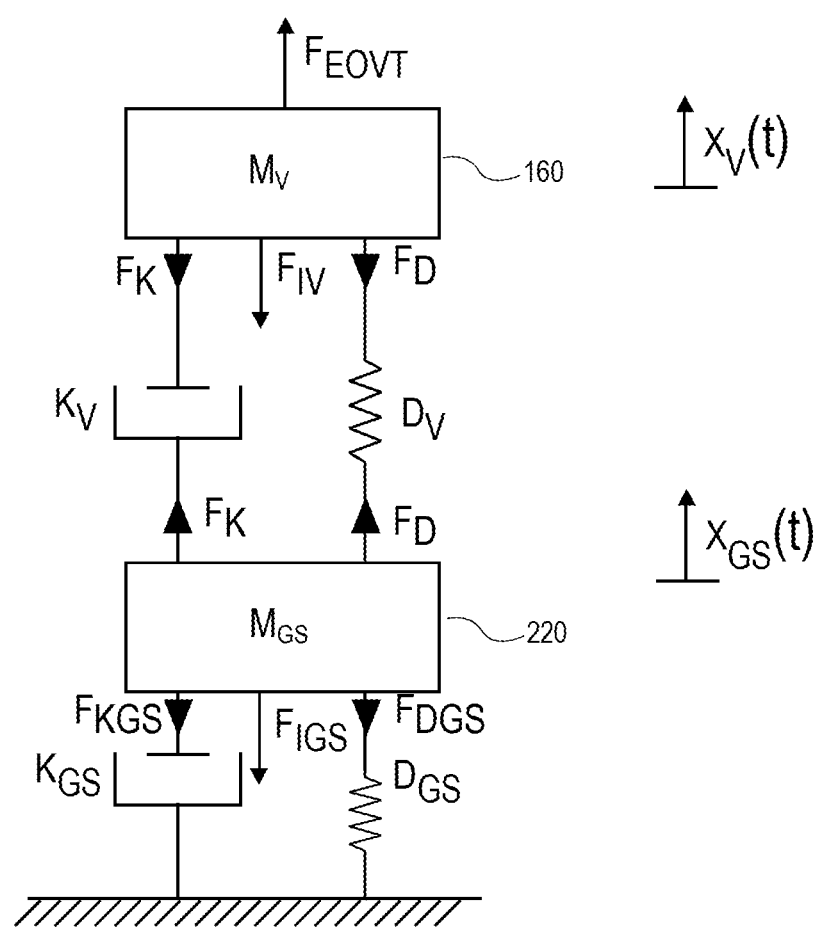
FIG. 5B is a block diagram of an exemplary force diagram, in accordance with embodiments of the present disclosure

FIG. 5B shows a simplified block force diagram 500 representing the behavior of the interaction of vehicle 160 and ground support equipment 220 at contact points 162 and 164 and contact surfaces 222 and 224. As shown in FIG. 5B, the force exerted on vehicle 160 ($F_{EOVT}$) may be opposed by an inertial force of vehicle 160 ($F_{IV}$), a net elastic restoring force ($F_K$) associated with vehicle 160's interaction with ground support equipment 220, and a net viscous damping force ($F_D$) associated with vehicle 160's interaction with ground support equipment 220. Additionally, $X_V(t)$ can represent a displacement of vehicle 160, $X_{GS}(t)$ can represent a displacement of ground support equipment 220, $F_{IGS}$ can represent an inertial force of ground support equipment 220, $F_{KGS}$ can represent an elastic restoring force associated with ground support equipment 220, $F_{DGS}$ can represent a viscous damping force associated with ground support equipment 220, $M_v$ can represent the mass of vehicle 160, MGS can represent the mass of ground support equipment 220, $K_V$ can represent a net elastic restoring coefficient associated with vehicle 160's interaction with ground support equipment 220, $D_V$ can represent a net viscous damping coefficient associated with vehicle 160's interaction with ground support equipment 220, KGS can represent an elastic restoring coefficient associated with ground support equipment 220, and $D_{GS}$ can represent a viscous damping coefficient associated with ground support equipment 220. For clarity, certain other forces (e.g., lateral frictional forces, etc.) have been omitted from FIG. 5B. Incorporating the equations above, the inertial force associated with vehicle 160 can be represented as:

$$F_{IV} = F_{EOVT}(t) - F_D - F_K$$

And:

$$F_{IV} = M_V \frac{d^2 X_V(t)}{dt^2}$$

Accordingly, this can be further represented as:

$$F_{IV} =$$
$$M_V \frac{d^2 X_V(t)}{dt^2} = F_{EOVT}(t) - D_V\left(\frac{dX_V(t)}{dt} - \frac{dX_{GS}(t)}{dt}\right) - K_V(X_V(t) - X_{GS}(t))$$

Similarly, the inertial force associated with ground support equipment 220 can be represented as:

$$F_{IGS} = F_D + F_K - F_{DGS} - F_{KGS}$$

And:

$$F_{IGS} = M_{GS} \frac{d^2 X_{GS}(t)}{dt^2}$$

Accordingly, this can be further represented as:

$$F_{IGS} = D_V\left(\frac{dX_V(t)}{dt} - \frac{dX_{GS}(t)}{dt}\right) + K_V(X_V(t) - X_{GS}(t)) - D_{GS}\frac{dX_{GS}(t)}{dt} - K_{GS}X_{GS}(t)$$

According to certain aspects of the present disclosure, both dynamic and frictional forces can also be introduced as additional terms to the equations above. As described herein, the forces measured by load cell 142 as vehicle 160 is placed onto and/or raised from ground support equipment 220 can be utilized in the above equations to determine, for example, the mass $M_V$ of vehicle 160, the mass $M_{GS}$ of ground support equipment 220, the viscous damping coefficient $D_V$ associated with vehicle 160, the viscous damping coefficient $D_{GS}$ associated with ground support equipment 220, the elastic restoring coefficient $K_V$ associated with vehicle 160, and the elastic restoring coefficient $K_{GS}$ associated with ground support equipment 220. According to certain aspects of the present disclosure, the measurements can be made during an iterative process where vehicle 160 is repeatedly placed onto and/or raised from ground support equipment 220 while oriented in different poses to obtain an overdetermined set of equations from which the mass $M_V$ of vehicle 160, the mass MGS of ground support equipment 220, the viscous damping coefficient $D_V$ associated with vehicle 160, the viscous damping coefficient $D_{GS}$ associated with ground support equipment 220, the elastic restoring coefficient $K_V$ associated with vehicle 160, and the elastic restoring coefficient $K_{GS}$ associated with ground support equipment 220 can be determined.

Figure 6:
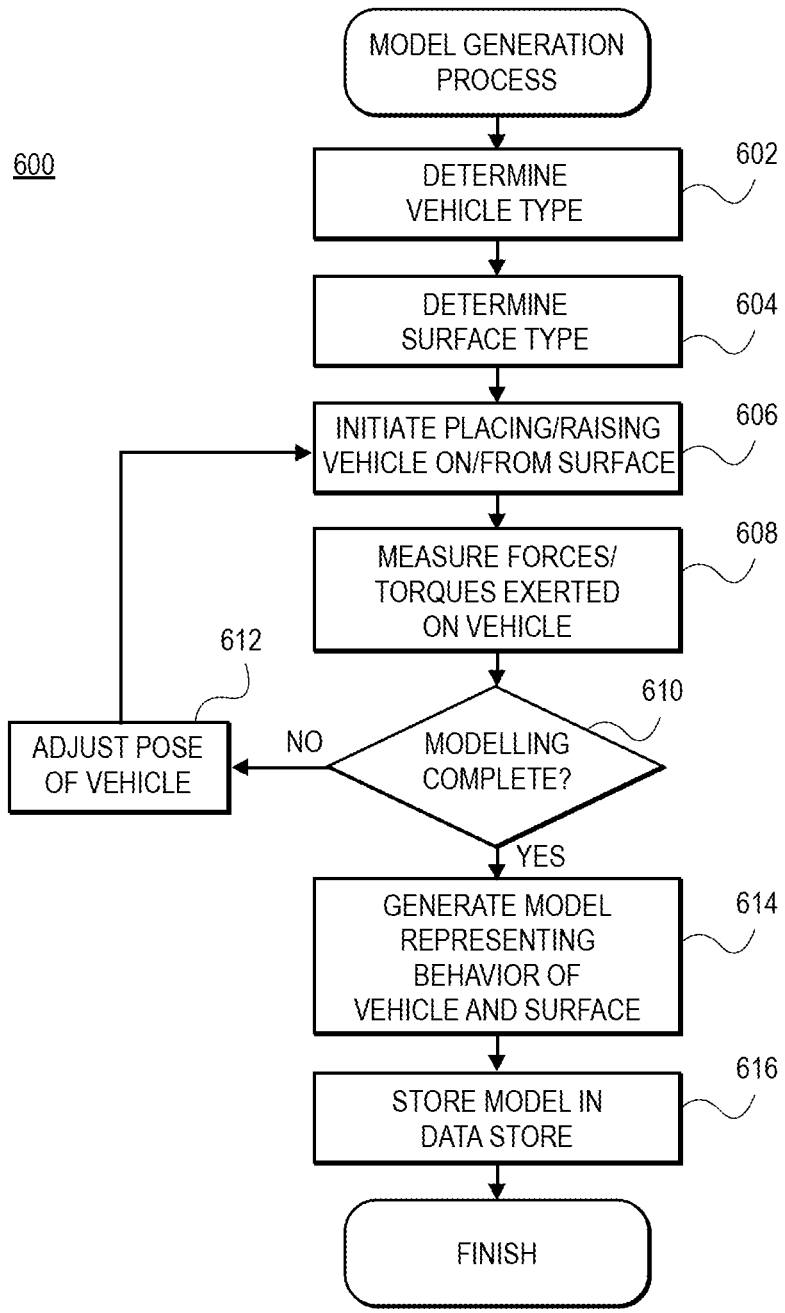
FIG. 6 is a flow diagram of an exemplary model generation process, in accordance with embodiments of the present disclosure.

FIG. 6 is a flow diagram of an exemplary process 600 for generating a model associated with a vehicle (e.g., vehicle 160) and a surface (e.g., ground surface 200 and/or ground support equipment 220), according to embodiments of the present disclosure. Process 600 can be performed by, for example, robot 110 with end-of-arm tool 140, which can include load cell 142 and end effector 144.

As shown in FIG. 6, in steps 602 and 604, a vehicle type and a surface type can be determined. For example, the robotic systems handling vehicle 160 may interact with numerous different vehicle types and number various surface types, and each vehicle type and surface type may present varied characteristics as a certain vehicle may interact with a certain surface. For example, the different vehicles may have different landing gears, materials, moments, etc. and the various surface types may also include different materials, components, etc. that may affect the interaction of a specific vehicle with a specific surface. Accordingly, the vehicle type (e.g., model type of the vehicle, etc.) and the surface type (e.g., ground surface, model of ground support equipment, etc.) may be determined so that a unique model can be generated for each vehicle type and surface type combination.

In step 606, placement of the vehicle onto the surface can be initiated. For example, this can be performed using a robotic system, such as robot 110, that has engaged a vehicle, such as vehicle 160, and maneuvers the vehicle to begin placement of the vehicle on a surface. Alternatively, the vehicle may be raised from a surface, according to other embodiments of the present disclosure. As the vehicle is being placed on (or raised from) the surface, various forces and/or torques exerted on the vehicle can be measured, as in step 608. The measurement of the forces and/or torques can include a plurality of measurements made over time, which can be performed throughout the placement process from when the placement process is initiated through and until the vehicle (e.g., vehicle 160) is placed and released (e.g., by robot 110) on the surface (e.g., surface 200). According to certain aspects, these forces and torques can be measured using a load cell, such as load cell 142. Alternatively, other force detectors and/or sensors may be employed.

As described further herein in connection with FIGS. 4B and 5B, the measured forces and/or torques can be used to generate a model representing the behavior of the interaction between the vehicle and the surface. According to certain aspects of the present disclosure, the vehicle and the surface can be modeled as mechanical systems (e.g., second order mechanical systems, etc.) and the various measured forces and/or torques exerted on the vehicle as the vehicle is being placed on (or raised from) the surface can facilitate determination of various characteristics such as, for example, dynamic and static frictional forces/coefficients, inertial masses of the vehicle and the surface, viscous damping coefficients, elastic restoring coefficients, etc. Accordingly, in step 610 it can be determined whether sufficient measurements have been taken to determine the various terms for generation of the model. If more measurements are desired, a pose of the vehicle may be adjusted (step 612), and placement (or raising) of the vehicle may again be initiated. These steps may be iteratively performed until sufficient measurements have been taken to facilitate determination of the desired terms in generating the model.

Once the measurements have been performed, various terms can be determined using the measurements and the model can be generated in step 614. This can facilitate safe handling of the vehicle so that the vehicle may not be stressed by reactive forces from the surface and is stably placed on the surface (e.g., the vehicle does not slip, bounce, move, etc.). In addition to generating the model, the model can also facilitate establishing processes and procedures for the safe handling of vehicles. For example, the models can be informative as to the pose of the vehicle that may mitigate risks for damaging the vehicle when the vehicle is being placed on (or being raised from) a certain surface. The model can also dictate how a vehicle is maneuvered when it is being placed on (or being raised from) a particular surface. Additionally, the generated model can facilitate testing and performing simulations of the vehicles and their behavior and interaction with various surfaces, which may further facilitate safe handling of the vehicles by obviating the need for actual physical testing of the vehicles and various surfaces.

Once the model has been generated for the vehicle type and the surface type, the model can be stored in a datastore, as in step 616. The datastore can store a plurality of models, where each of the plurality of models corresponds to a particular vehicle type and a particular surface. Accordingly, during automated handling of vehicles, the appropriate corresponding model can be retrieved in view of the vehicle type and the surface type to facilitate safe handling of the vehicle.

Figure 7:
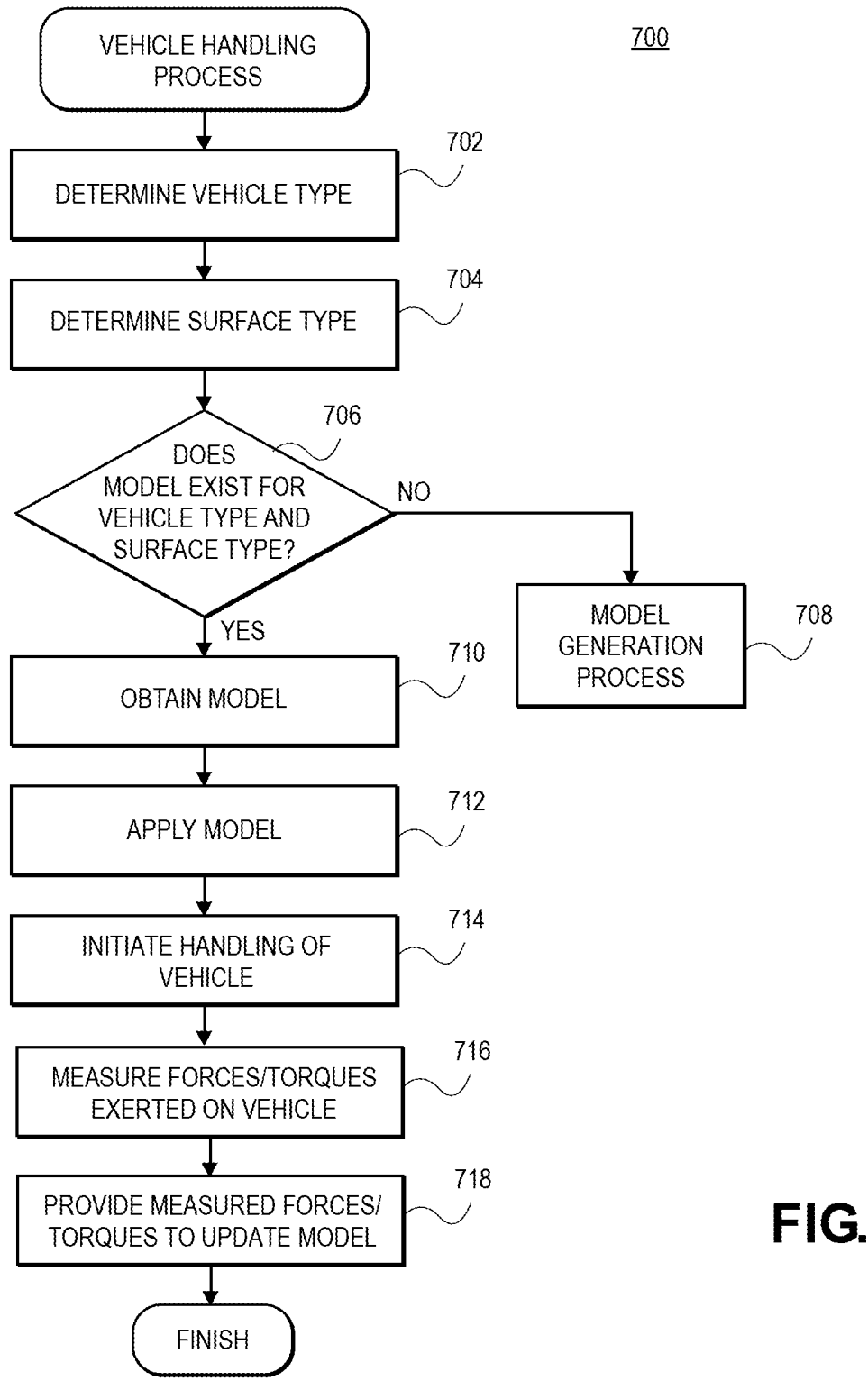
FIG. 7 is a flow diagram of an exemplary vehicle handling process, in accordance with embodiments of the present disclosure.

FIG. 7 is a flow diagram of an exemplary process 700 for automated handling of a vehicle. Process 700 can be performed by, for example, by any robotic system, such as robot 110 with end-of-arm tool 140, that may engage and perform automated handling of a vehicle.

In step 702, the type of vehicle to be handled may be determined. For example, the vehicle can include an aerial vehicle such as a UAV, and the vehicle type may indicate the model, etc. of the vehicle being handled. During handling of the vehicle, the robotic system may be instructed to place the vehicle on (or raise the vehicle from) a surface. Accordingly, in step 704, the surface type may be determined. For example, this can include a ground surface, a ground support equipment, a storage rack, or any other surface or structure with which the vehicle may interact.

After the vehicle type and surface type have been determined, it may be assessed whether a model exists for the combination of the vehicle type and the surface type, as in step 706. As described herein, a unique model may be generated for each combination of a vehicle type and a surface type to represent the behavior of the interaction of the particular vehicle type with the particular surface type. If no model exists for the combination of the determined vehicle type and surface type, a model may be generated in step 708. The model generation process represented by step 708 may include exemplary process 600.

Alternatively, if a model exists for the combination of the determined vehicle type and the surface type, the model can be obtained in step 710. For example, the model can be obtained from a datastore which may include unique models that correspond to each combination of vehicle type and surface type. After the model has been obtained, in step 712, the model can be applied to facilitate safe handling of the vehicle. For example, the model can represent the behavior of the interaction of the vehicle and the surface, and application of the model can include defined processes or procedures (e.g., certain defined poses in which to orient the vehicle, a sequence of defined maneuvers, etc.) to facilitate safe handling of the vehicle.

Next, in step 714, handling of the vehicle can be initiated in accordance with the model. This can include, for example, placing the vehicle on (or raising the vehicle from) the surface. As shown in step 716, the forces and/or torques exerted on the vehicle as the vehicle is being handled can be continuously monitored and measured. Optionally, these measured values can be compared against the applied model as feedback, and the model can be updated based on the measured forces and/or torques, if necessary (step 718).

Figure 8:
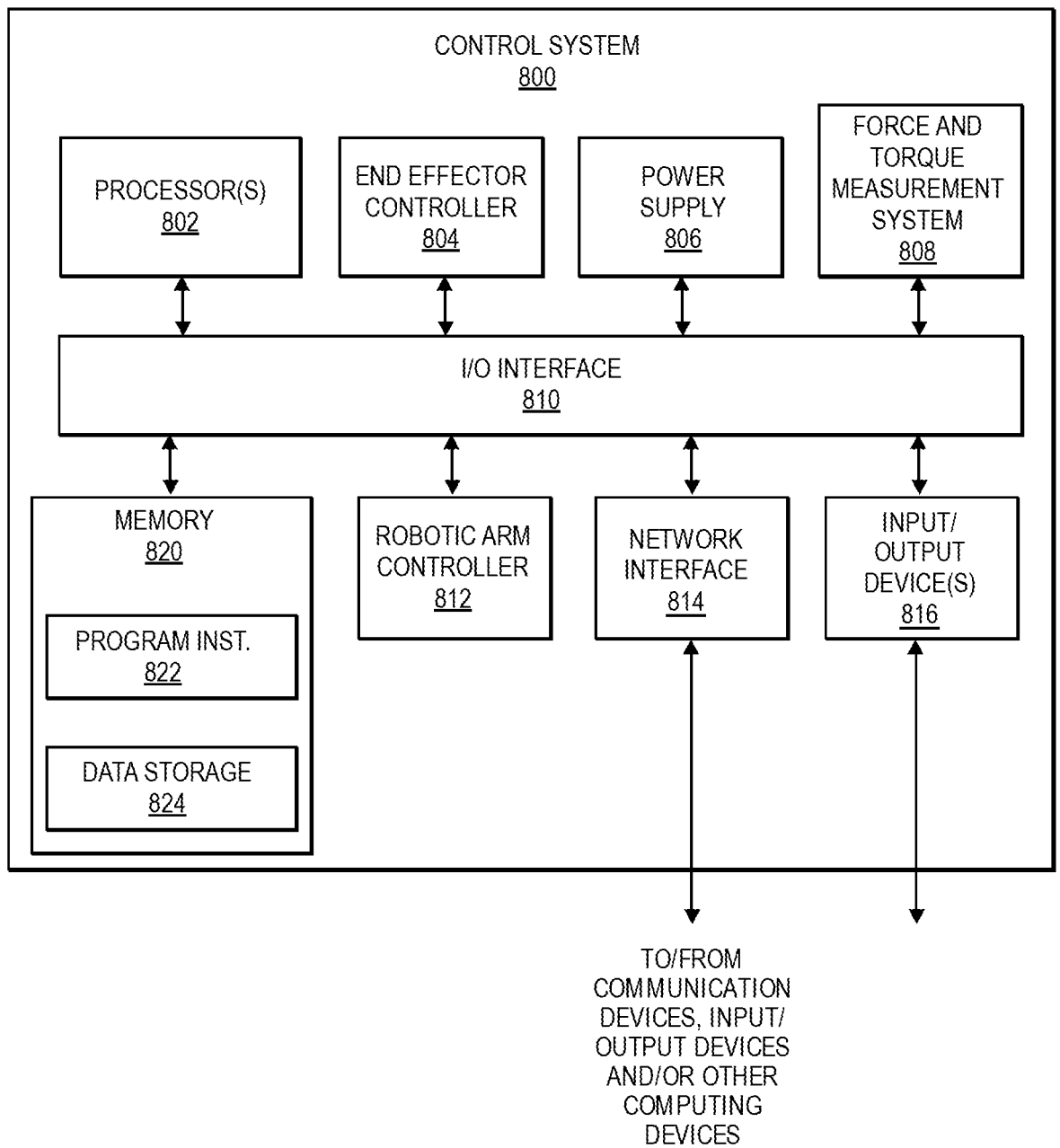
FIG. 8 is an exemplary control system, in accordance with embodiments of the present disclosure.

FIG. 8 is a block diagram illustrating various components of an exemplary robot control system 800, in accordance with embodiments of the present disclosure. According to certain aspects, control system 150 may include the features of control system 800.

In various examples, the block diagram may be illustrative of one or more aspects of the robot control system 800 that may be used to implement the various systems and methods discussed herein and/or to control operation of a robot discussed herein. In the illustrated implementation, the robot control system 800 includes one or more processors 802, coupled to a memory, e.g., a non-transitory computer readable storage medium 820, via an input/output (I/O) interface 810. The robot control system 800 also includes end effector controllers 804, such as motor controllers, power modules 806, force and torque measurement system 808, and/or robotic arm controller 812. The robot control system 800 further includes a network interface 814, and one or more input/output devices 816.

In various implementations, the robot control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, manipulation instructions, predetermined protocols and/or sequenced movements, aerial vehicle types, and/or data items accessible by the processor(s) 802. In various implementations, the non-transitory computer readable storage medium 820 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822 and data storage 824, respectively. According to certain aspects, the various models for the various vehicle types and surface type may be stored in data storage 824. In other implementations, program instructions, data, models, and/or model generation algorithms may be received, sent, or stored upon different types of computer-accessible media, such as non-transitory media, or on similar media separate from the non-transitory computer readable storage medium 820 or the robot control system 800. Generally speaking, a non-transitory, computer readable storage medium may include storage media or memory media such as magnetic or optical media, e.g., disk or CD/DVD-ROM, coupled to the robot control system 800 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 814.

In one embodiment, the I/O interface 810 may be configured to coordinate I/O traffic between the processor(s) 802, the non-transitory computer readable storage medium 820, and any peripheral devices, the network interface or other peripheral interfaces, such as input/output devices 816. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The end effector controller 804 and robotic arm controller 812 may communicate with the robot to adjust the manipulation, orientation, or other parameters of the pivots and/or motors to facilitate operation of the robot.

The end effector controller 804 and robotic arm controller 812 may include sensors that can be used to manipulate, orient, and position the robotic arm and/or the end effector. The end effector controller 804 and robotic arm controller 812 can communicate with the actuator(s) or motor(s) (e.g., a servo motor) used to manipulate, engage, and/or disengage aerial vehicles. Additionally, end effector controller 804 and robotic arm controller 812 may communicate with force and torque measurement system 808 to perform the various force and torque measurements as described herein.

The network interface 814 may be configured to allow data to be exchanged between the robot control system 800, other devices attached to a network, such as other computer systems (e.g., remote computing resources), and/or with aerial vehicle control systems of other aerial vehicles. For example, the network interface 814 may enable wireless communication between the aerial vehicle and an aerial vehicle control system that is implemented on one or more remote computing resources. For wireless communication, an antenna of the aerial vehicle or other communication components may be utilized. As another example, the network interface 814 may enable wireless communication between numerous aerial vehicles. In various implementations, the network interface 814 may support communication via wireless general data networks, such as a Wi-Fi network. For example, the network interface 814 may support communication via telecommunications networks, such as cellular communication networks, satellite networks, and the like.

Input/output devices 816 may, in some implementations, include one or more displays, imaging sensors (e.g., cameras), speed sensors, force and torque detectors, laser sensors (e.g., LIDAR), thermal sensors, radar, thermal sensors, accelerometers, gyroscopes, RFID sensors, etc. Multiple input/output devices 816 may be present and controlled by the robot control system 800. One or more of these sensors may be utilized to implement the implementations described.

As shown in FIG. 8, the memory may include program instructions 822, which may be configured to implement the example routines and/or sub-routines described herein. The data storage 824 may include various data stores for maintaining data items that may be provided for robot navigation, determining routing of the robot, locating aerial vehicle locations, locating aerial vehicle handling locations, detecting objects or object types, determining track layout, generation and/or storing of models, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the robot control system 800 is merely illustrative and is not intended to limit the scope of the present disclosure. In particular, the computing system and devices may include any combination of hardware or software that can perform the indicated functions. The robot control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated robot control system 800. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the robot control system 800 may be transmitted to the robot control system 800 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other robot control system configurations.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6 and 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   causing a first robotic arm to initiate placement of a first aerial vehicle on a first surface;
   as the first aerial vehicle is being placed on the first surface, measuring, using a load cell, at least one of a force or a torque exerted on the first aerial vehicle;
   generating a model representing an interaction between the first aerial vehicle and the first surface based at least in part on at least one of the force or the torque, the model corresponding to a first aerial vehicle type associated with the first aerial vehicle and a first surface type associated with the first surface;
   storing the model in a datastore;
   determining, for a second aerial vehicle that is to be placed on a second surface, that a second aerial vehicle type associated with the second aerial vehicle is the same as the first aerial vehicle type;
   determining that a second surface type associated with the second surface is the same as the first surface type;
   obtaining the model from the datastore; and
   applying the model in causing at least one of the first robotic arm or a second robotic arm to place the second aerial vehicle on the second surface.

2. The method of claim 1, wherein the load cell is disposed at a wrist of the first robotic arm.

3. The method of claim 1, wherein the load cell is configured to provide force and torque measurements in six degrees of freedom of movement.

4. The method of claim 1, further comprising:
   measuring at least one of a second force or a second torque exerted on the second aerial vehicle as the second aerial vehicle is placed on the second surface.

5. The method of claim 4, further comprising:
   updating the model based at least in part on at least one of the second force or the second torque.

6. A system, comprising:
   a robotic arm;
   a datastore; and
   a control system including one or more processors and program instructions that, when executed by the one or more processors, cause the one or more processors to at least:
      cause the robotic arm to initiate placement of a vehicle engaged with the robotic arm on a surface;
      measure at least one of a force or a torque exerted on the vehicle as the vehicle is placed on the surface;
      generate a model, based at least in part on at least one of the force or the torque, representing an interaction of the vehicle with the surface; and
      store the model in the datastore.

7. The system of claim 6, wherein placement of the vehicle is performed with the vehicle oriented in a first pose, and wherein the program instructions, when executed by the one or more processors, further cause the one or more processors to at least:
   prior to generation of the model:
      cause the robotic arm to adjust a pose of the vehicle such that the vehicle is oriented in a second pose;
      cause the robotic arm to initiate placement of the vehicle with the vehicle oriented in the second pose; and
      measure at least one of a second force or a second torque exerted on the vehicle as the vehicle is placed on the surface while oriented in the second pose, and
   generate the model further based at least in part on at least one of the second force or the second torque.

8. The system of claim 6, wherein generation of the model includes determining at least one of:
   an inertial force of the vehicle;
   an elastic restoring force between the vehicle and the surface;
   a dynamic frictional force between the vehicle and the surface;
   a static frictional force between the vehicle and the surface; or
   a viscous damping force between the vehicle and the surface.

9. The system of claim 6, wherein the program instructions, when executed by the one or more processors, further cause the one or more processors to at least:
   measure a plurality of forces or a plurality of torques during placement of the vehicle on the surface, the plurality of forces or the plurality of torques being measured throughout the placement of the vehicle on the surface.

10. The system of claim 6, wherein the robotic arm includes a load cell, and wherein the force and the torque are measured by the load cell.

11. The system of claim 10, wherein the robotic arm includes an end effector configured to engage the vehicle, and the load cell is rigidly coupled to the end effector.

12. The system of claim 6, wherein the datastore includes a plurality of models, each of the plurality of models associated with a corresponding vehicle type and a corresponding surface type.

13. The system of claim 6, wherein the interaction between the vehicle and the surface occurs at a contact point of the vehicle and a contact surface of the surface.

14. The system of claim 13, wherein the vehicle is an aerial vehicle and the contact point of the aerial vehicle includes a landing gear.

15. The system of claim 6, wherein a surface type of the surface includes at least one of a ground support equipment or a ground surface.

16. The system of claim 6, wherein the program instructions, when executed by the one or more processors, further cause the one or more processors to at least one of:
- determine, based at least in part on the model, a vehicle handling procedure associated with a vehicle type of the vehicle and a surface type of the surface; or
- perform a simulation, based at least in part on the model, of an interaction of the vehicle and the surface.

17. A robotic arm, comprising:
an end effector; and
a control system including one or more processors and program instructions that, when executed by the one or more processors, cause the one or more processors to at least:
- determine a vehicle type associated with a vehicle engaged by the end effector;
- determine a surface type associated with a surface;
- obtain a model corresponding to the vehicle type and the surface type; and
- apply the model in causing the robotic arm to at least one of:
  - place the vehicle on the surface, or
  - raise the vehicle from the surface.

18. The robotic arm of claim 17, wherein the program instructions, when executed by the one or more processors, further cause the one or more processors to at least:
- measure at least one of a force or a torque exerted on the vehicle as the vehicle is placed on the surface or raised from the surface; and
- update the model based on the force or the torque.

19. The robotic arm of claim 18, further comprising a load cell configured to measure at least one of the force or the torque exerted on the vehicle.

20. The robotic arm of claim 19, wherein the load cell is rigidly coupled to the end effector.

* * * * *